A. W. JACKSON.
AIR BRAKE HOSE COUPLING.
No. 11,141. Reissued Jan. 27, 1891.
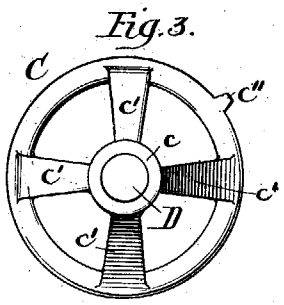
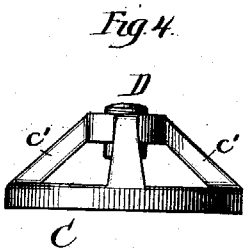
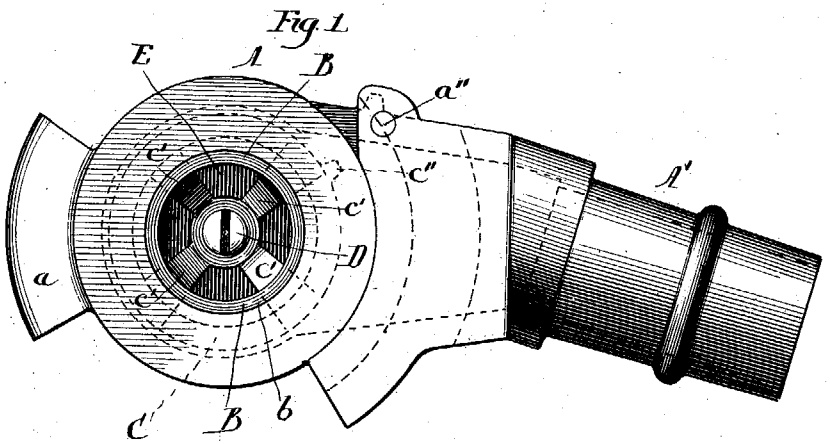
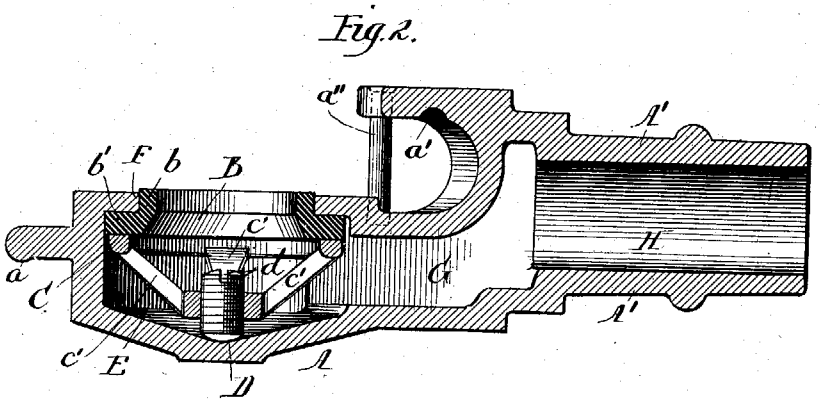
Witnesses:
Fred Gerlach
Jno. C. MacGregor
Inventor:
Amariah W. Jackson
THE NORRIS PETERS CO., PHOTO-LITHO., WASHINGTON, D. C.

UNITED STATES PATENT OFFICE.

AMARIAH W. JACKSON, OF CHICAGO, ILLINOIS.

AIR-BRAKE HOSE-COUPLING

SPECIFICATION forming part of Reissued Letters Patent No. 11,141, dated January 27, 1891.

Original No. 434,873, dated August 19, 1890. Application for reissue filed September 5, 1890. Serial No. 364,073.

*To all whom it may concern:*

Be it known that I, AMARIAH W. JACKSON, a citizen of the United States, residing at Chicago, in the county of Cook and State of Illinois, have invented a certain new and useful Improvement in Air-Brake Hose-Couplings; and I do hereby declare that the following is a full, clear, and exact description of the invention, which will enable others skilled in the art to which it pertains to make and use the same, reference being had to the accompanying drawings, in which—

Figure 1 is a plan view of the face or port side of a coupling, showing the compressor inside by dotted lines. Fig. 2 is a vertical longitudinal section of Fig. 1. Fig. 3 is a bottom or under side view of a compressor. Fig. 4 is an edge view of the compressor of Fig. 3.

This invention relates more especially to that class of hose-couplings used in connection with an air-brake apparatus for connecting the sections of hose on the cars, by which compressed air is utilized in setting the brakes, but can be used for connecting hose used for other purposes—as, for instance, conveying steam through a train of cars for heating purposes. The couplings of this class consist of two duplicate companion sections which can be readily interlocked together, and which can be equally as readily uncoupled, and this feature of coupling and uncoupling readily is a necessity, especially for air-brake and car-heating purposes, because of the constant changing of cars in making up trains. The duplicate sections of the coupling of this class each have a chamber inclosed by a front wall, a peripheral wall, and a rear wall, the rear wall being formed usually by a plug screwed into place, and the front wall has a port or opening by which communication is had between the chambers of the two coupling-sections when together, and, as the coupling must not leak, the joint between the inner walls of the two sections when together is made tight by a gasket or packing, which is located in and around the port of the inner wall, and this gasket or packing in one form of construction has been held in place by a skeleton frame having an annular rim with arms radiating to a boss in the center. The gasket or packing and the skeleton frame are admitted to the chamber by boring out or forming an opening for such admission in the back wall of the coupling, and this hole or opening is closed by a screw-threaded plug fitted thereinto. This plug has a recess bored into it to admit and steady the boss on the skeleton frame, and the plug is then used to force the skeleton frame against the gasket, making an air-tight joint. This construction of coupling, while it will accomplish the end or purpose for which it was intended, has objectionable features, among which may be mentioned the labor and skill required to make the coupling and have it perfect in its working, the necessity of having an extra coupling in each car, and the requirement that it must be taken to a shop to remove the gasket, which is the first thing to wear out, in order to replace it with a new one.

The objects of this invention are to enable the gasket to be effectually compressed without moving the back wall of the coupling-shell, to readily advance and recede the gasket-compressor in the chamber of the coupling for compressing the gasket, and for removing a worn or unserviceable gasket and replacing it by a new gasket without any difficulty, and without the necessity of removing the entire section of the coupling, and to improve generally the construction and operation of the coupling as a whole; and its nature consists in the several parts and combination of parts hereinafter described, and pointed out in the claims as new.

In the drawings, A represents a shell having an extension A′. The shell A is formed of an inner or front wall having therein a port or opening to receive a gasket or packing, a peripheral or side wall, and an outer or rear wall, and, as shown, the several walls of the shell are integral. The forward end of the shell has a flange with a bead forming a locking-lip *a*, and the inner or port face of the coupling, back of the port or opening, has an overhanging lip or flange with a groove *a′*, corresponding to the bead of the lip *a*, which groove *a′* receives the bead of the lip *a* of the companion section of the coupling and furnishes the means for uniting or interlocking the coupling-sections, and, as shown, the coupling at one side of the overhanging grooved lip has a stop-pin *a″* to hold the sections against turning apart.

B is a gasket or packing for making an air-tight joint at the port or opening. Such gasket or packing has a wall *b*, entering and projecting through the port or opening, and a wall *b'*, encircling the port or opening inside of the port-wall, as shown in Fig. 2.

C is an annular rim or ring engaging the wall *b'* of the gasket, which lies inside of the port-wall and forming a compressor for forcing the wall of the gasket or packing against the port-wall, and holding the gasket or packing in place to make a tight joint at the port. This rim or ring has extending therefrom at an angle to a center or hub *c* four arms or braces *c'*, forming a cone, which gives a strong support or bracing for the rim or ring. The rim or ring C, as shown, has on its periphery a lug *c''* to engage the wall of the chamber and hold the rim or ring against continued turning.

D is an adjuster for advancing and receding the compressor rim or ring C, for which purpose the adjuster D has an exterior screw-thread, which works in the hub or center *c* in the arrangement shown. The inner end or head of this adjuster D has a nick *d* to receive the end of a screw-driver, by which the adjuster can be turned; but such inner end or head could be squared or otherwise formed to receive a bit-wrench or other device for turning the adjuster. The outer or bearing end of this adjuster D, as shown in Fig. 2, bears or rests upon the inner face of the outer or rear wall of the shell of the coupling, and, as shown, this end of the adjuster is rounded and the inner face of the wall is slightly concave, so that the adjuster will center itself to its proper place.

E is the chamber of the coupling in which the compressor is located.

F is the port through the inner or front wall of the coupling, communicating with the chamber E, and in which the gasket or packing B is located.

G is a passage in the body of the coupling-shell, communicating with the chamber E.

H is a passage in the extension A', communicating with the passage G.

Only one section of a complete coupling is shown. The companion section will be a duplicate of the one shown.

The coupling-shell A shown has its walls continuous or integral, and the compressor C is located in the chamber of the shell A, and this construction of a continuous coupling-shell with the compressor in its chamber is had by embedding the finished compressor in a sand or other destructible or removable core, placing such core, with the compressor therein, in a mold of the desired shape to produce the coupling-shell, casting the shell around the core, and then removing the shell from the mold and destroying or removing the core, leaving the compressor loose inside of the shell and its chamber for action on the gasket without any more fitting and so that it can be advanced and be pressed against the under side of the gasket or packing on the inside of the chamber by turning the adjuster D.

In use the adjuster D is entered into the center or hub *c* for its outer end to bear against the rear or outer wall of the shell A on the inside and the compressor C receded by turning the adjuster backward to leave a sufficient space between the acting face of the compressor C and the inside face of the front or inner wall of the coupling-shell for the insertion of the gasket or packing B, and such insertion of the gasket or packing is had by bending the gasket or packing and entering the wall *b'* thereof inside of the chamber E, with the wall *b* in the port F. The gasket or packing is then compressed or held in place to make a tight joint by turning the adjuster D forward to advance the compressor C, forcing the wall *b'* of the gasket or packing B tightly against the wall of the shell around the port F, as shown in Fig. 2.

The coupling, with the gasket or packing therein and tightly compressed, is attached to the end of the hose by the stem or extension A', and the two parts of the coupling are connected together in use by interlocking the lip *a* with the groove *a'*, as usual, joining two sections of hose together, and when it is required to remove or replace a gasket or packing B all that is necessary to be done is to disconnect the coupling-sections, insert a screw-driver or wrench through the gasket or packing port, turn the adjuster D backward, receding the compressor, so as to release the gasket or packing, remove the gasket or packing, and insert a new one by bending and inserting it at the port or opening, then by means of the screw-driver or wrench turning the adjuster D forward to advance the compressor C until the gasket or packing is tightened to the required pressure, and this operation can be repeated as often as a gasket has to be removed for repairs or for replacement by a new gasket or packing, and such removal and replacement can be made by an unskilled person, as all that is required is a screw-driver or a wrench, and the repairs will require but a moment to make and can be made on the road, and to make repairs all that will be required is an extra gasket and a screw-driver or wrench.

The gist of the present invention is the inserting and holding in place of the gasket or packing and the removal and replacement of the gasket or packing in a hose-coupling for air or steam by advancing and receding a compressor through the turning of an adjuster and making a tight joint for the port of the coupling, with the compressor remaining in the chamber of the coupling, and without removing or operating any portion of the coupling-shell; and in carrying out the invention the several parts constituting the coupling as a whole can be of the form and arrangement shown or of other suitable form and arrangement so long as the construction embodies the feature of a gasket or packing compressor inclosed in the chamber of the coupling and advanced and receded within the chamber by the movements of an adjuster while the walls of the shell remain immovable and intact.

What I claim as new, and desire to secure by Letters Patent, is—

1. The combination, in a hose-coupling, of a compressor for a gasket or packing located within the chamber of the coupling-shell and having a bearing-face to impinge against the wall of the gasket or packing, and an adjuster having screw-threaded engagement with the compressor for advancing and receding the compressor within its chamber and have the advance of the compressor force and tightly close the gasket or packing circumferentially around its opening, substantially as and for the purposes specified.

2. The combination, in a coupling, of a coupling-shell, a chamber in such shell, a port communicating with the chamber, a gasket or packing entering and located circumferentially around the port, a compressor located in the chamber and having an acting face to engage the wall of the gasket or packing within the chamber-shell, and an adjuster having screw-threaded engagement with the compressor to advance and recede the compressor in its chamber for removing, inserting, and tightly closing the gasket or packing circumferentially around the port without removal of the compressor or the wall of its chamber, substantially as specified.

3. The combination, in a coupling, of a connecting-port, a gasket or packing for such port having a wall entering the port and a wall circumferentially around the port on the inside, a compressor having an acting face to engage the inside wall of the gasket or packing at all points, and an adjuster having a positive engagement with the compressor for both advancing and receding the compressor within the walls of the coupling without moving the bearing-wall of the adjuster, substantially as and for the purposes specified.

4. The combination, in a hose-coupling for air and steam, of a gasket-compressor having an annular acting rim bearing against the entire circumferential face of the gasket, with bracing-arms from the rim to a center or hub, and a screw-threaded adjuster coacting with said hub for advancing and receding the compressor-rim with the movements of the adjuster for removing, inserting, and compressing a gasket or packing without removing the wall of the coupling-shell, substantially as as and for the purposes specified.

5. The combination, in a hose-coupling, of a gasket-compressor having an annular acting face with a center or hub carrying the acting face, and an adjuster passing through and having screw-threaded engagement with the center or hub and bearing against the back wall of the coupling shell for advancing and receding the compressor and inserting, removing, and tightly closing a gasket or packer peripherally around its port, substantially as specified.

6. The combination, in an air-brake hose-coupling, of the gasket-compressor C, having an annular rim with arms connected therewith converging to a hub at an angle, forming a cone, with an adjuster-screw D fitted in said hub with its head on the concave side, its point resting against the inner back of the shell A, and the rim pressing the gasket B up against the under side of the port, substantially as described.

AMARIAH W. JACKSON.

Witnesses:
O. W. BOND,
JNO. C. MACGREGOR.